(12) United States Patent
Lah

(10) Patent No.: US 9,334,447 B2
(45) Date of Patent: May 10, 2016

(54) FLUSHING SYSTEM FOR USE IN DELAYED COKING SYSTEMS

(71) Applicant: Ruben F. Lah, South Jordan, UT (US)

(72) Inventor: Ruben F. Lah, South Jordan, UT (US)

(73) Assignee: DeltaValve, LLC, Sandy, UT (US)

(*) Notice: Subject to any disclaimer, the term of this patent is extended or adjusted under 35 U.S.C. 154(b) by 718 days.

(21) Appl. No.: 13/656,535

(22) Filed: Oct. 19, 2012

(65) Prior Publication Data

US 2014/0110243 A1    Apr. 24, 2014

(51) Int. Cl.
*C10B 43/08* (2006.01)
*C10B 25/22* (2006.01)
*F16K 3/02* (2006.01)
*C10B 25/10* (2006.01)

(52) U.S. Cl.
CPC .............. *C10B 43/08* (2013.01); *C10B 25/10* (2013.01); *C10B 25/22* (2013.01); *F16K 3/02* (2013.01); *F16K 3/0209* (2013.01)

(58) Field of Classification Search
CPC ........ C10B 25/10; C10B 25/22; C10B 43/08; F16K 3/02; F16K 3/0209
See application file for complete search history.

(56) References Cited

U.S. PATENT DOCUMENTS

| | | | | |
|---|---|---|---|---|
| 4,358,343 | A * | 11/1982 | Goedde et al. | 201/1 |
| 4,970,969 | A * | 11/1990 | Koptis et al. | 110/190 |
| 6,660,131 | B2 * | 12/2003 | Lah | 202/245 |
| 6,964,727 | B2 * | 11/2005 | Lah | 202/244 |
| 7,666,280 | B2 * | 2/2010 | Kersternich | 202/241 |
| 7,931,044 | B2 * | 4/2011 | Lah et al. | 137/15.06 |

* cited by examiner

*Primary Examiner* — Renee E Robinson
*Assistant Examiner* — Jonathan Miller
(74) *Attorney, Agent, or Firm* — Michael F. Krieger; Kirton McConkie

(57) ABSTRACT

A de-header valve can include a flushing system for flushing undesirable material from the upper and lower bonnets while the de-header valve is opened. The flushing system can include three valves. A first valve controls the flow of steam to the de-header valve. A second valve controls the flow of water for flushing the bonnets. A third valve controls how the bonnets are drained. The third valve can be a three way valve that allows the bonnets to be drained to a pit during flushing, and also allows steam condensate to drain into a steam trap.

15 Claims, 6 Drawing Sheets

FLUSHING SYSTEM FOR USE IN DELAYED COKING SYSTEMS

CROSS-REFERENCE TO RELATED APPLICATIONS

This application claims priority to U.S. Provisional Patent Application No. 61/549,204, titled "Seat, Valve and Flush Systems For Use In Delayed Coker System," which was filed on Oct. 19, 2011.

BACKGROUND

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

When one coke drum is full, it must be purged of the byproduct fed into it. The drum is steam purged and cooled with quench water. The drum is then drained of water and vented to atmospheric pressure, after which the top and bottom heads are removed (i.e. the coke drum is de-headed) to allow the coke to be cut from the drum and fall into a catch basin, typically a rail car. This process of de-heading the coke drum can be extremely dangerous for several reasons. To mention only a few, the cooling water introduced into the hot drums prior to the removal of the bottom head becomes extremely hot and could leak from the loosened head and scald surrounding operators, the load of un-drained water and loose coke within the drum may exceed the limits of the support system and cause heavy equipment to fall, positioning the chute and necessary removal of the flanges or heads is done with operators who are in close proximity to the drums, potentially falling coke may injure workers as the heads are removed, and operating personnel may be exposed to finely divided coke particles, steam, hot water and noxious gases, when the drum is opened. Indeed several fatalities occur each year as a result of this manufacturing process. Once the coke is removed, the heads are replaced and the coke drum is prepared to repeat the cycle.

BRIEF SUMMARY

The present invention provides a flushing system for use in flushing and draining the valve body of a de-header valve. The flushing system can also be applied to similar valves that are used for purposes other than de-heading a coke drum. The flushing system can be included within newly installed de-header valves, or may be added to existing de-header installations. The flushing system allows the valve body to be flushed while the de-header valve is being opened thereby removing any material that enters the valve body.

In one embodiment, a flushable de-header valve for a coke drum comprises a main body portion configured to attach to a coke drum; an upper bonnet configured to attach to the main body portion, the upper bonnet including a cavity; a lower bonnet configured to attach to the main body portion opposite the upper bonnet, the lower bonnet including a cavity; and a flushing system for flushing undesirable material that enters the cavities of the upper and lower bonnets while the de-header valve is being opened.

In another embodiment, a de-header valve configured to attach to a coke drum used for delayed coking comprises a main body portion configured to attach to a coke drum, an upper bonnet configured to attach to the main body portion, a lower bonnet configured to attach to the main body portion opposite the upper bonnet; and a flushing system for flushing undesirable material that enters the interior of the upper and lower bonnets while the de-header valve is being opened.

The flushing system comprises a steam valve for controlling the flow of steam into the interior of the upper and lower bonnets; a water valve for controlling the flow of water into the interior of the upper and lower bonnets; a drain valve for controlling the flow of water from the interior of the upper and lower bonnets; and a processing device for controlling the position of the steam, water, and drain valves.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
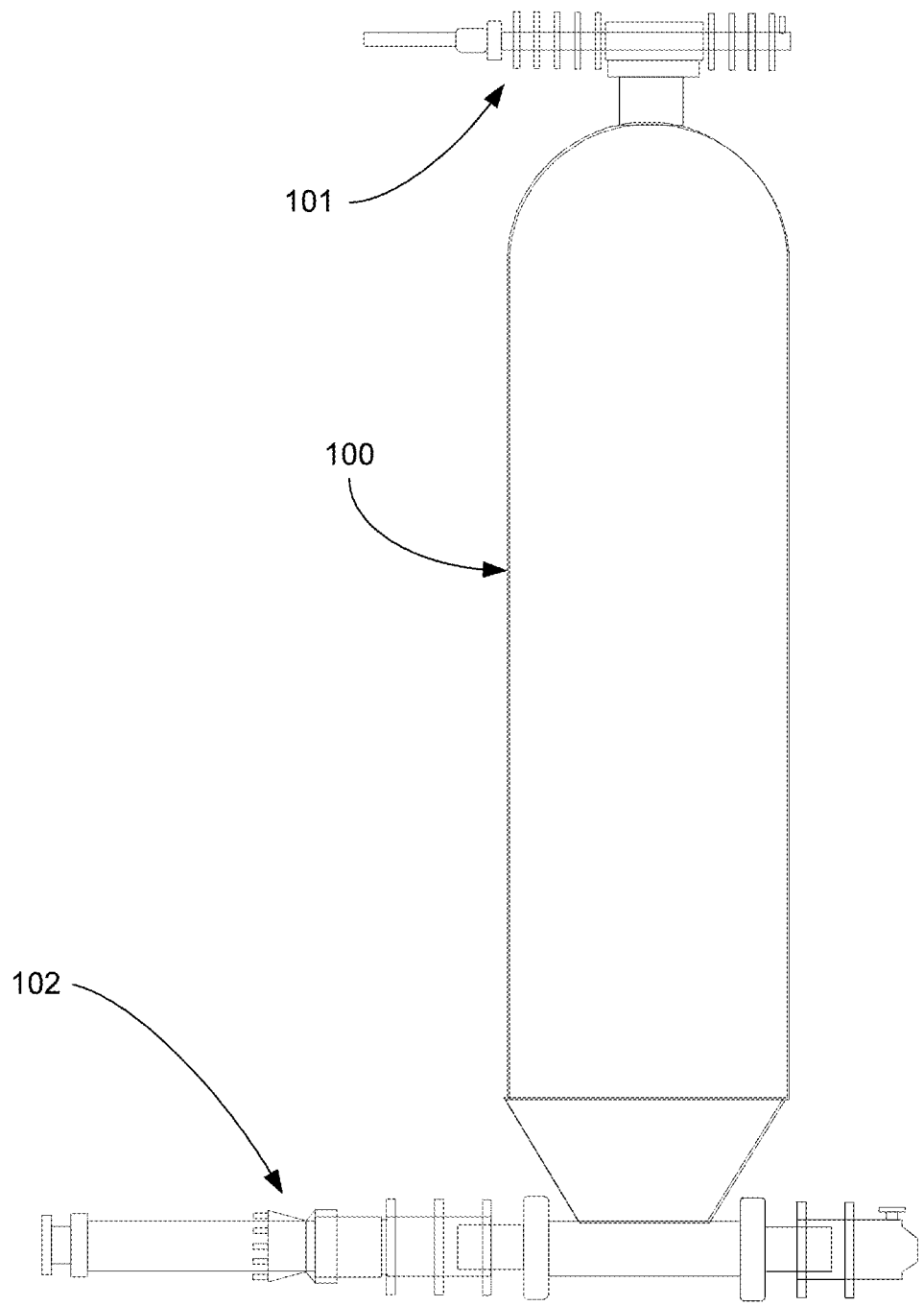
FIG. 1 illustrates an exemplary coke drum with a top and bottom de-header valve on which the flushing system of the present invention could be used.

The present invention provides a flushing system for use in flushing and draining the valve body of a de-header valve. The flushing system can also be applied to similar valves that are used for purposes other than de-heading a coke drum. The flushing system can be included within newly installed de-header valves, or may be added to existing de-header installations. The flushing system allows the valve body to be flushed while the de-header valve is being opened thereby removing any material that enters the valve body.

In one embodiment, a flushable de-header valve for a coke drum comprises a main body portion configured to attach to a coke drum; an upper bonnet configured to attach to the main body portion, the upper bonnet including a cavity; a lower bonnet configured to attach to the main body portion opposite the upper bonnet, the lower bonnet including a cavity; and a flushing system for flushing undesirable material that enters the cavities of the upper and lower bonnets while the de-header valve is being opened.

In another embodiment, a de-header valve configured to attach to a coke drum used for delayed coking comprises a main body portion configured to attach to a coke drum, an upper bonnet configured to attach to the main body portion, a lower bonnet configured to attach to the main body portion opposite the upper bonnet; and a flushing system for flushing undesirable material that enters the interior of the upper and lower bonnets while the de-header valve is being opened.

The flushing system comprises a steam valve for controlling the flow of steam into the interior of the upper and lower bonnets; a water valve for controlling the flow of water into the interior of the upper and lower bonnets; a drain valve for controlling the flow of water from the interior of the upper and lower bonnets; and a processing device for controlling the position of the steam, water, and drain valves.

General Discussion of Delayed Coking and Coke De-Heading

In the typical delayed coking process, high boiling petroleum residues are fed to one or more coke drums where they are thermally cracked into light products and a solid residue-petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke.

The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,000° F.

With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25-30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke, and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown. The delayed coking process is a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. This is a timely process, with each batch in the batch-continuous process taking approximately 12-20 hours to complete.

In essence, hot oil, or resid as it is commonly referred to, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures.

After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again in the manufacture of coke.

The decoking process is the process used to remove the coke from the drum upon completion of the coking process. Due to the shape of the coke drum, coke accumulates in the area near and attaches to the heads during the manufacturing process. To decoke the drum, the heads must first be removed. Typically, once full, the drum is vented to atmospheric pressure and the top head (typically a 4-foot diameter flange) is unbolted and removed to enable placement of a hydraulic coke cutting apparatus.

After the cooling water is drained from the vessel, the bottom head (typically a 7-foot-diameter flange) is unbolted and removed. This process is commonly known as "de-heading" and can be a very dangerous procedure because of the size of the flanges, the high temperatures within the drum, potential falling coke, and other reasons as mentioned above. Once the heads are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or loading facilities.

General Discussion of a Coke Drum De-Heading System

Although the present invention is intended to cover both top and bottom de-heading systems, or rather the de-heading system of the present invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system and the following discussion pertaining to the bottom de-heading system is not meant to be limiting to such.

The present invention describes a method and system for flushing a de-header valve during the coking process. As the present invention is especially adapted to be used in the coking process, the following discussion will relate specifically to this manufacturing area. It is foreseeable, however, that the present invention may be adapted to be an integral part of other manufacturing processes producing various elements other than coke, and such processes should thus be considered within the scope of this application.

FIG. 1 illustrates a coke drum 100 having a top de-header valve 101 and a bottom de-header valve 102. Top and bottom de-header valves 101, 102 can comprise sliding blind valves as further described below. These valves are closed to form a pressure tight seal during the coking process. After coke has been formed within coke drum 100, top and bottom de-header valves 101, 102 can be opened to allow the removal of the coke.

Figure 2A:
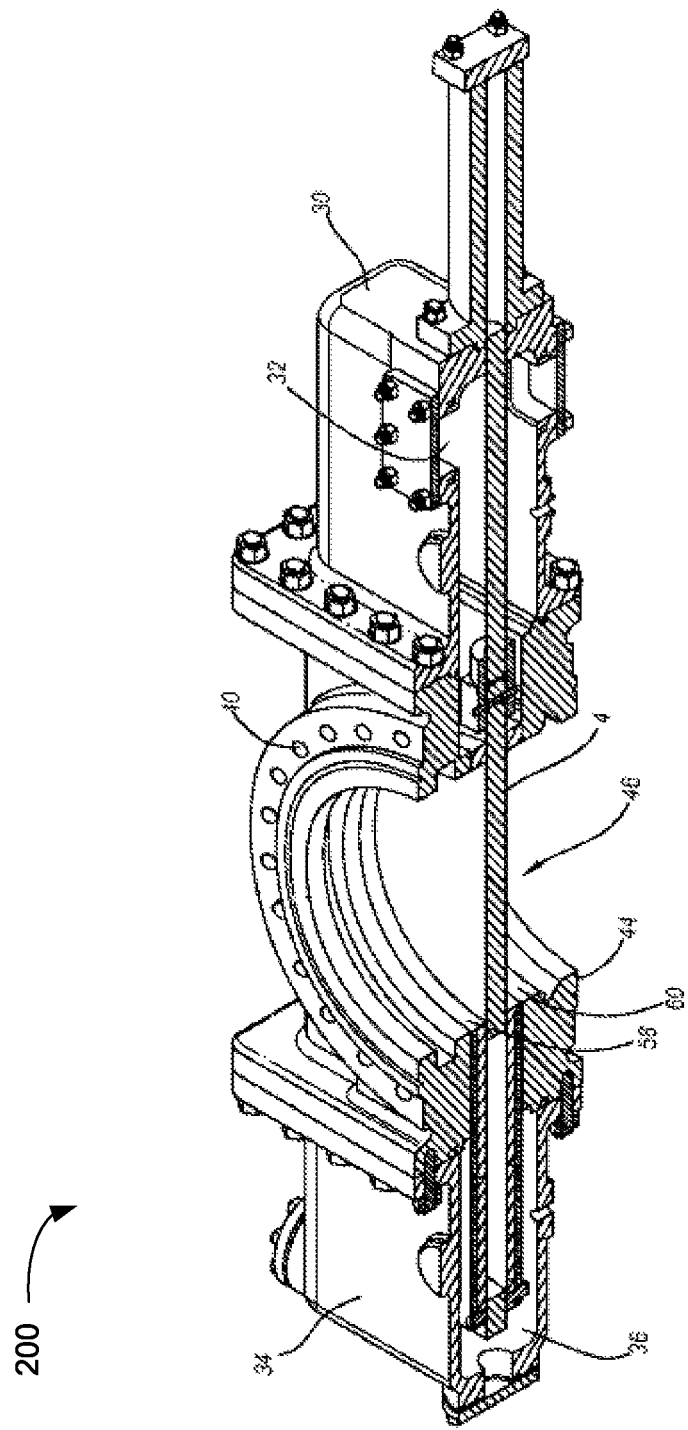
FIGS. 2A-2B illustrate an exemplary de-header valve on which the flushing system of the present invention could be used.
Figure 2B:
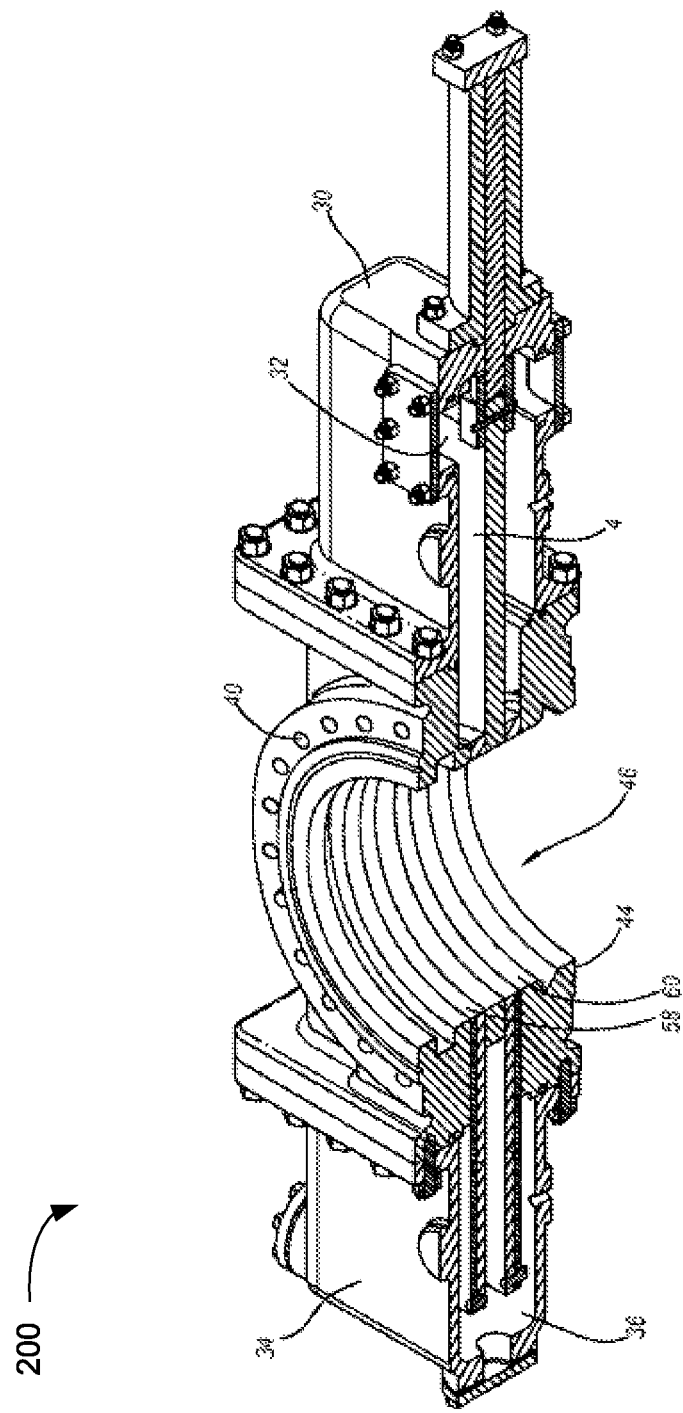

FIGS. 2A and 2B illustrate an exemplary de-header valve 200 that could be used as either top de-header valve 101 or bottom de-header valve 102. The remainder of the specification will generally relate to the de-header valve used on a coke drum (e.g. bottom de-header valve 102). However, it is to be understood that the described features of the invention could be applied to a de-header valve on the top or bottom of a coke drum, or to another similar type of valve used on a drum.

De-header valve 200 includes a main body portion comprising flanges 40 and 44 by which the valve can be mounted to a coke drum or other container. The main body also includes an opening 46 with FIGS. 2A and 2B showing the valve in the closed and open positions respectively.

De-header valve 200 also includes upper bonnet 30 having a cavity 32 and lower bonnet 34 having a cavity 36. Cavities 32 and 36 allow de-header valve 200 to be opened and closed by sliding blind 4, which includes an opening corresponding to opening 46, between seats 58, 60.

Upper seat 58 and lower seat 60 can be comprised of a dynamic, live loaded seat and a static seat, with the preferred configuration comprising a dynamic live loaded upper seat 58, and a static lower seat 60. An alternative embodiment may comprise a dynamic, live loaded lower seat and a static upper seat. In the preferred embodiment, the static seat is a one piece seat that is securely fastened to de-header valve 200 and is preferably non-adjustable. However, it is within the scope of this invention that both the upper and lower seats could be dynamic and/or adjustable, or that both the upper and lower seats could be static.

Because coke drum 100 is pressurized during the coking process, it is desirable to pressurize cavities 32 and 36 within upper and lower bonnets 30 and 34 to minimize the amount of material that passes from inside the pressurized coke drum 100 to the cavities (e.g. due to any pressure differential). The pressurizing of cavities 32 and 36 is often accomplished using a steam pressurizing system (not shown). In short, pressurized steam is injected into cavities 32 and 36 which are sufficiently sealed to allow for pressure build up to approximate the pressure present within coke drum 100.

Even when using a steam pressurizing system, material from within coke drum 100 often passes into cavities 32 and 36. This material has a detrimental effect on de-header valve 200 because the material can interact with the moving components of the valve thereby increasing the wear on and shortening the lifespan of the valve.

Flushing System for De-Header Valve

During the coking process, while the de-header valve is closed and pressurized, coke and coke fines are prevented from entering the bonnets of the valve. The same is true when the valve is fully open because a seal is formed between the seats and blind when the blind is fully closed or fully open. However, while the blind is being opened, this seal is broken and coke and coke fines are able to enter into the bonnets. This undesirable material can cause damage to the de-header valve. For example, the undesirable material can enter the steam trap used to collect steam condensate from the de-header valve thereby clogging the steam trap. The undesirable material can also increase the wear on the moving components of the valve. According to embodiments of the invention, a de-header valve can include a flushing system that may be used to flush this undesirable material that may have entered the bonnets while the coke drum is being opened.

Figure 4:
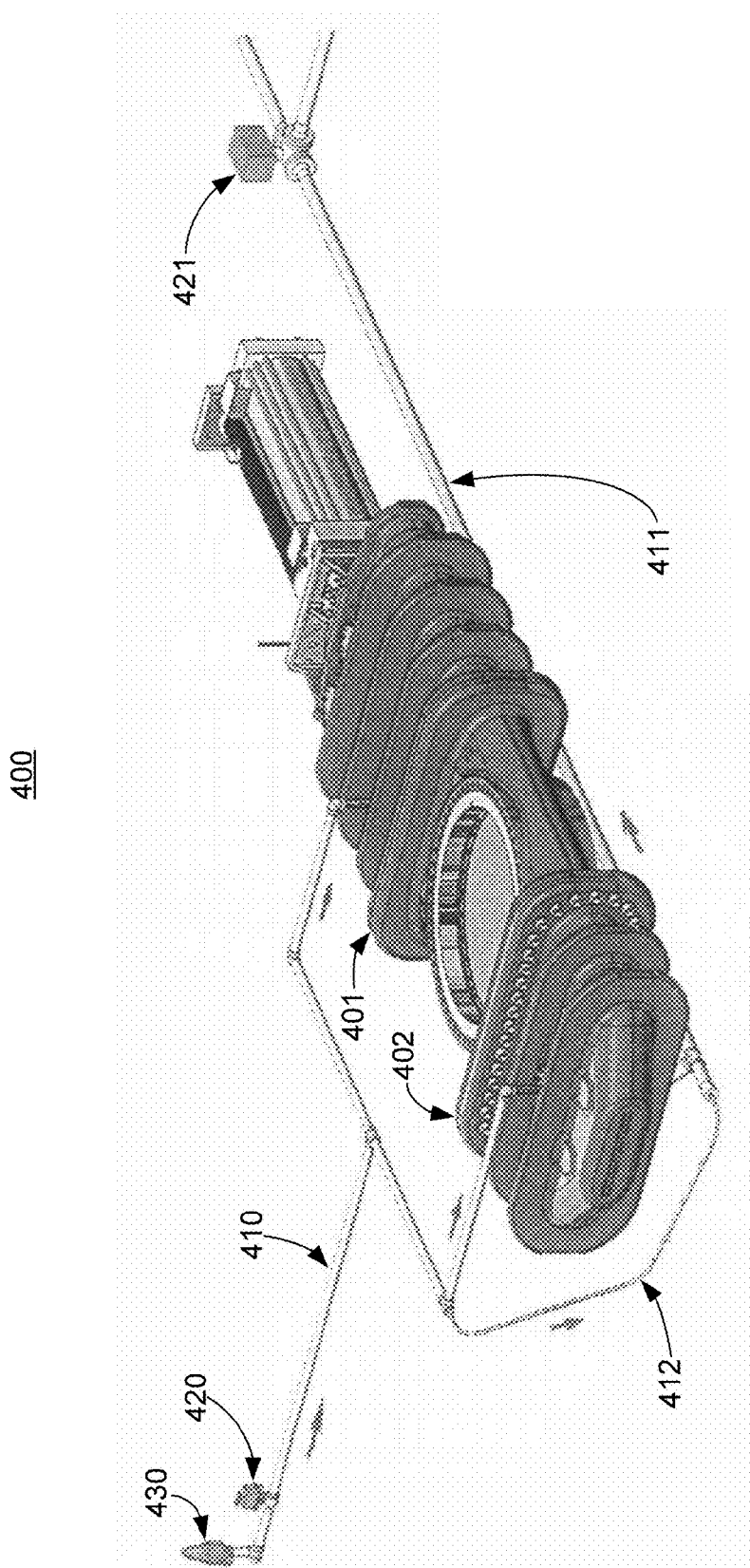
FIG. 4 illustrates an exemplary de-header valve having a flushing system.

FIG. 4 illustrates an exemplary embodiment of a de-header valve 400 that includes a flushing system. As shown, water is fed to the upper bonnet 401 and lower bonnet 402 using a pipe 410. Pipe 410 includes a valve 420 for controlling the flow of water into pipe 410.

The water that is fed into upper bonnet 401 and lower bonnet 402 flushes the bonnets of undesirable material such as coke and coke fines that may have entered the cavities of the bonnets. This water and undesirable material is drained from the bonnets via pipe 411.

Also, pipe 410 is connected to pipe 411 via pipe 412. Pipe 412 feeds water directly into pipe 411 to assist in flushing pipe 411 of the water and undesirable material that drains from the bonnets. By feeding water directly from pipe 410 to pipe 411, pipe 412 assists in flushing the solid debris from pipe 411. For example, if the water flowing through the bonnets and out into pipe 411 does not have a sufficient velocity, the solid debris in the water may settle within pipe 411 rather than being flushed into the pit. Pipe 412 allows water to be directly injected into pipe 411 to increase the velocity at which the water exits into the pit thereby facilitating the complete removal of solid debris from pipe 411.

Pipe 411 also includes a valve 421. In some embodiments, valve 421 can be a three way valve having a closed position for sealing pipe 411, a first open position for opening pipe 411 to allow pipe 411 to drain into the coke pit, and a second open position for opening pipe 411 to allow steam condensate in pipe 411 to drain into a steam trap.

Although not shown in FIG. 4, de-header valve 400 can include a third valve (labeled 423 in FIG. 5) for controlling steam flow into upper bonnet 401 and lower bonnet 402. This steam valve can be used to pressurize the bonnets during the coking process to minimize the difference between the internal pressure within the coke drum and the pressure within the bonnets.

In some embodiments, these three valves can be operated in a specific sequence to successfully flush the bonnets of undesirable material. As stated above, during the coking process, steam valve 423 is opened to pressurize the bonnets. During the coking process, steam valve 423 is generally kept open to pressurize the valve, and valve 421 is placed in the second open position to allow steam condensate to flow into the steam trap. The flushing process can be commenced just prior to the opening sequence of de-header valve 400.

Accordingly, the first step in the flushing process is to shut steam valve 423 thereby allowing the pressure within the bonnets to decline. This first step can be performed just prior to opening de-header valve 400.

The second step in the flushing process is to open valve 421 to the first open position to allow pipe 411 to drain into the pit. In some cases, this second step can be performed after the pressure within the bonnets has been relieved, but just prior to opening de-header valve 400. However, in other cases it may be desirable to open valve 421 to the first open position while de-header valve 400 is still pressurized because opening valve 421 can increase the speed at which the pressure decreases. While in the first open position, valve 421 prevents flow into the steam trap.

The third step in the flushing process is to open valve 420 to allow water to flow into pipe 410 and through the bonnets thereby flushing the bonnets of undesirable material. This third step can be performed after it has been confirmed that valve 421 has been opened to the first position. Valve 420 can remain open for the necessary duration to ensure that the bonnets are adequately flushed. In some embodiments, this duration can be the time while the valve is being opened (i.e. when the blind is not fully closed or fully open). For example, this duration can be as little as three minutes (if it takes three minutes to open the valve) or up to 45 minutes if the valve is throttled. A flow rate of 100-200 gpm through each bonnet can be used during this duration. Of course, other flow rates and flush durations could also be used.

At this point, valve 420 could be closed and valve 421 returned to the second open position thereby completing the flushing process. However, in some embodiments, the flushing process can include further steps to maximize the flushing of the undesirable material.

For example, in some embodiments, the flushing process can include an optional step of opening steam valve 423 after valve 420 has been closed but while valve 421 remains in the first open position. In this way, the steam pressure that builds once steam valve 423 is opened can help push any remaining water or material from pipe 411 into the pit.

Each of the three valves 420, 421, 423 can be electrically actuated (e.g., via processing device 450) and provide feedback regarding their position. In this way, each valve can be operated remotely with the assurance that each valve is in the correct position at each step. The flushing system may also include a flow transducer (shown as 440 in FIG. 5) to regulate the flow of water through valve 410 to ensure that adequate water flow is provided during the flushing process.

In some embodiments, pipes 410 and 411 can connect to the bonnets at a distance of at least 15 feet from the centerline of the coke drum to which de-header valve 400 is to be attached. By placing the pipes at this distance, the pipes are in a reduced hazard area.

In some embodiments, pipe 410 can have a 2 inch diameter, pipe 411 can have a 3 inch diameter, and pipe 412 can have a ½ inch diameter. Of course, other diameters can be used for any of the pipes. Also, in some embodiments, pipe 410 can include a pressure relief valve 430.

Although the flushing system has been described with reference to de-header valve 400, the flushing system could also be used on de-header valves having other configurations, or on other types of valves that include bonnets.

Figure 5:
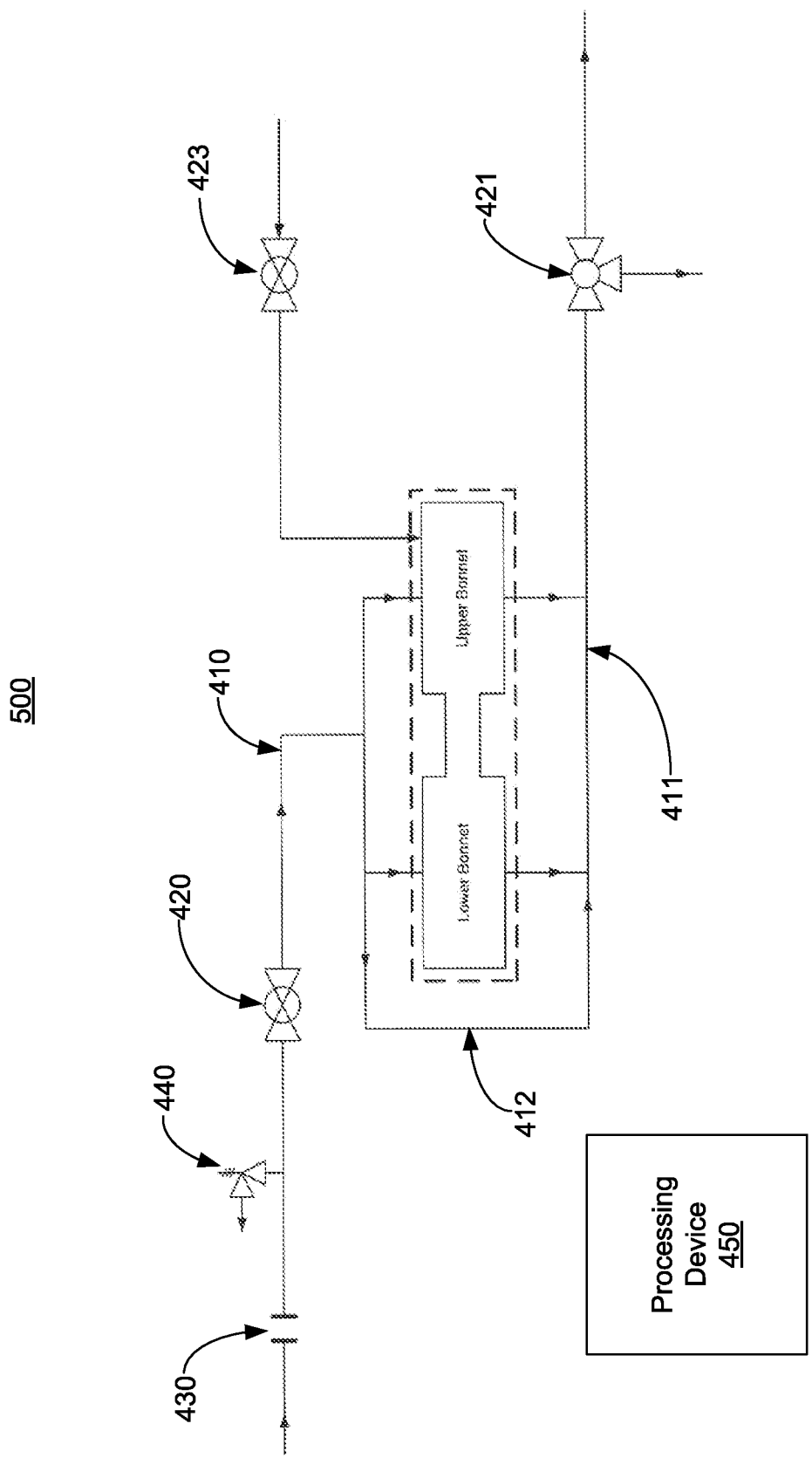
FIG. 5 illustrates an exemplary schematic of a de-header valve having a flushing system.

FIG. 5 illustrates a schematic 500 of a de-header valve having a flushing system. The components of the flushing system are labeled with similar numbers as in FIG. 4.

Figure 3:
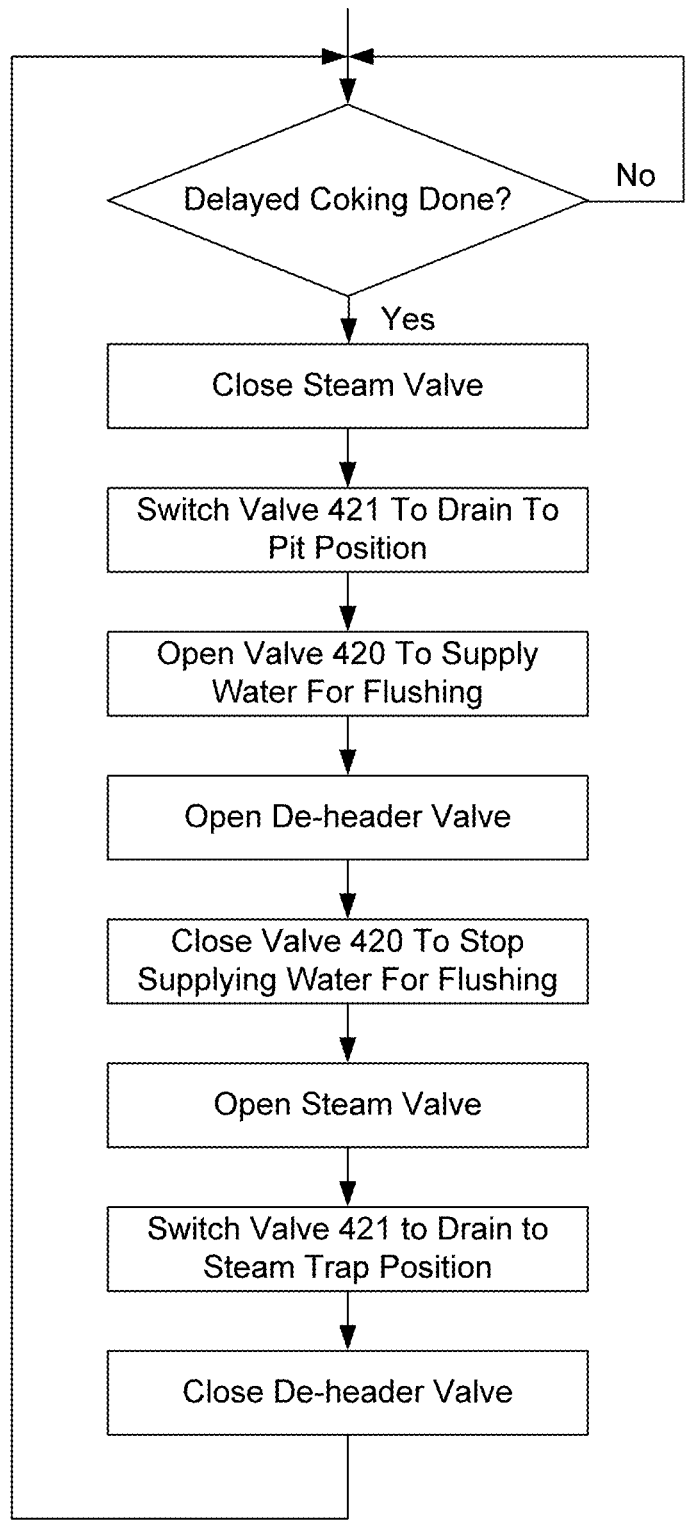
FIG. 3 illustrates a flowchart of a flushing process for a de-header valve.

FIG. 3 illustrates a flow chart of the steps that are performed during the flushing process as described above. As noted above, the steps of "switching valve 421 to drain to steam trap position" and "close de-header valve" could be reversed from what is shown in FIG. 3. However, opening the steam valve prior to switching valve 421 to drain to the steam trap is preferred in many implementations because it ensures that any water or debris left in the de-header valve or pipe 411 after valve 420 is closed can be flushed to the pit by the steam buildup.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A flushable de-header valve for a coke drum comprising:
   a main body portion configured to attach to a coke drum;
   an upper bonnet configured to attach to the main body portion, the upper bonnet including a cavity;
   a lower bonnet configured to attach to the main body portion opposite the upper bonnet, the lower bonnet including a cavity; and
   a flushing system for flushing undesirable material that enters the cavities of the upper and lower bonnets while the de-header valve is being opened, the flushing system comprising:
   a first pipe having a first end fluidly coupled to a water source and a second end fluidly coupled to one or both of the cavities of the upper and lower bonnets, the first pipe providing water to one or both of the cavities of the upper and lower bonnets to flush the undesirable material from one or both of the cavities;
   a second pipe having a first end fluidly coupled to one or both of the cavities and a second end, the second pipe removing the water and the undesirable material from one or both of the cavities;
   a third pipe having a first end fluidly coupled to the first pipe and a second end fluidly coupled to the second pipe, the third pipe providing water from the first pipe directly to the second pipe to assist in flushing the second pipe;
   a water supply valve fluidly coupled to the first end of the first pipe, the water supply valve having an open position and a closed position;
   a drain valve fluidly coupled to the second end of the second pipe, the drain valve having a first open position, a second open position, and a closed position, wherein, when in the first open position, the drain valve provides a fluid path to a coke pit, and when in the second open position, the second valve provides a fluid path to a steam trap; and a steam supply valve fluidly coupled to the cavities of the upper and lower bonnets, the steam supply valve being coupled to a steam source.

2. The flushable de-header valve of 1, wherein the steam, water, and drain valves are each configured with an electric actuator to allow remote control of the valves.

3. The flushable de-header valve of claim 2, further comprising a processing device for controlling the steam, water, and drain valves.

4. The flushable de-header valve of claim 3, wherein the processing device is configured to close the steam valve prior to the de-header valve being opened.

5. The flushable de-header valve of claim 4, wherein the processing device is further configured to, after the steam valve is closed but prior to the de-header valve being opened, open the drain valve to the first open position.

6. The flushable de-header valve of claim 5, wherein the processing device is further configured to open the water valve after the drain valve is opened to the first position thereby allowing water to flow through the upper and lower bonnets.

7. The flushable de-header valve of claim 6, wherein the processing device is further configured to maintain the water valve open while the de-header valve is being opened.

8. The flushable de-header valve of claim 7, wherein the processing device is further configured to close the water valve after the de-header valve is fully open.

9. The flushable de-header valve of claim 8, wherein the processing device is further configured to switch the drain valve to the second open position that drains to the steam trap.

10. The flushable de-header valve of claim 9, wherein the processing device is further configured to open the steam valve prior to switching the drain valve to the second open position.

11. The flushable de-header valve of claim 1, wherein the flushing system further includes a pressure relief valve.

12. The flushable de-header valve of claim 1, wherein the flushing system further includes a flow transducer to control the flow rate of water through the water valve.

13. A de-header valve configured to attach to a coke drum used for delayed coking, the de-header valve comprising:
a main body portion configured to attach to a coke drum;
an upper bonnet configured to attach to the main body portion;
a lower bonnet configured to attach to the main body portion opposite the upper bonnet;
a flushing system for flushing undesirable material that enters the interior of the upper and lower bonnets while the de-header valve is being opened, the flushing system comprising:
a steam valve for controlling the flow of steam into the interior of the upper and lower bonnets, the steam valve having an open position and a closed position;
a water valve for controlling the flow of water into the interior of the upper and lower bonnets, the water valve having an open position and a closed position;
a drain valve for controlling the flow of water from the interior of the upper and lower bonnets, the drain valve having a first open position, a second open position, and a closed position, wherein, when in the first open position, the flow of water is directed to a coke pit and when in the second open position, a fluid path is created to a steam trap; and
a processing device for controlling the position of the steam, water, and drain valves.

14. The de-header valve of claim 13, wherein the processing device:
closes the steam valve prior to the de-header valve being opened;
positions the drain valve in the first open position prior to the de-header valve being opened;
opens the water valve to supply water to the upper and lower bonnets while the de-header valve is being opened;
closes the water valve to stop the supply of water to the upper and lower bonnets once the de-header valve is open; and
switches the drain valve to the second open position.

15. The de-header valve of claim 13, wherein the processing device opens the steam valve after the water valve is closed but prior to switching the drain valve to the second open position.

* * * * *